No. 728,405. PATENTED MAY 19, 1903.
C. W. McMILLAN.
COTTON CHOPPING ATTACHMENT FOR CULTIVATORS.
APPLICATION FILED OCT. 24, 1902.
NO MODEL.
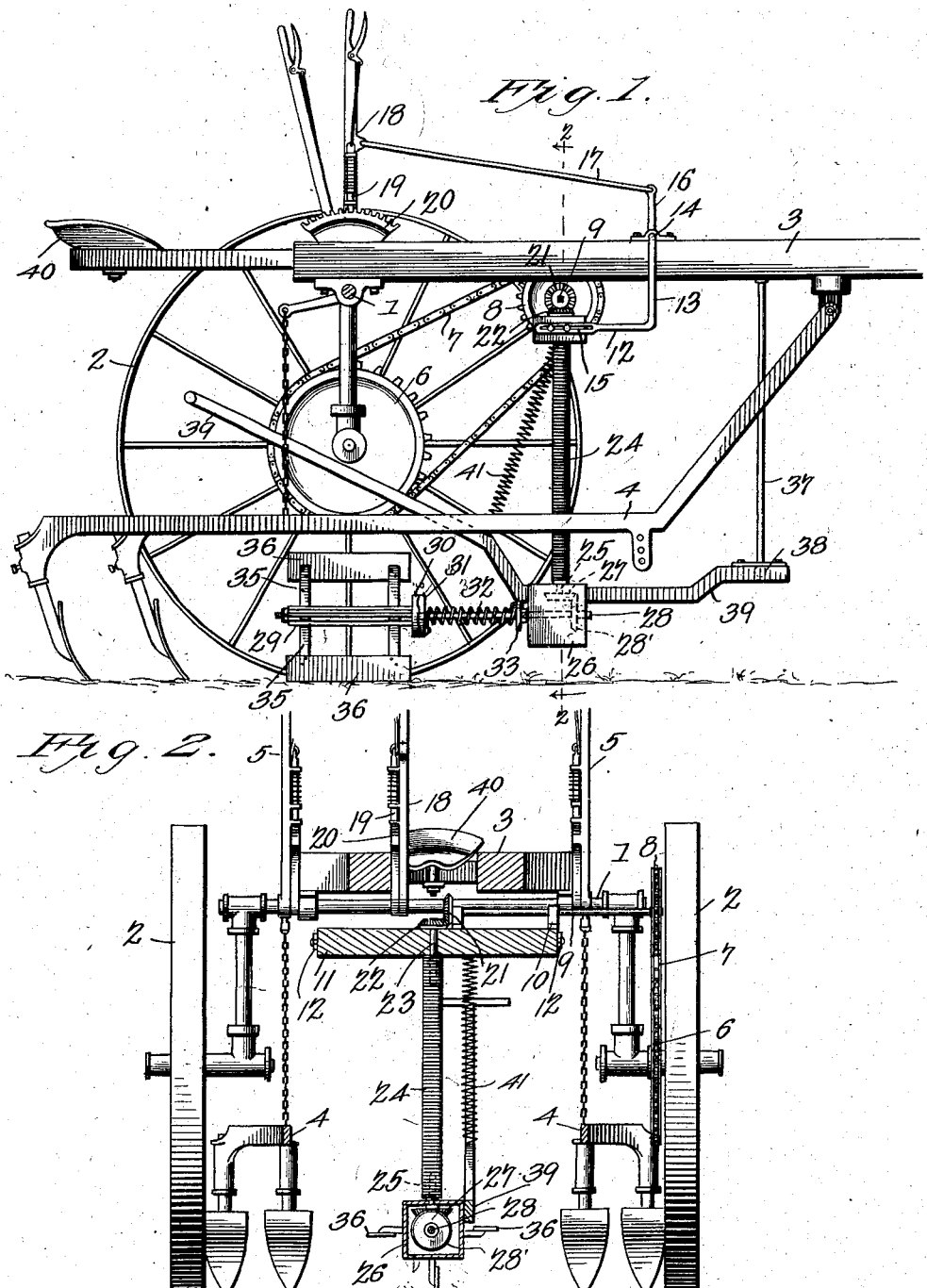

No. 728,405.

Patented May 19, 1903.

UNITED STATES PATENT OFFICE.

CHARLES WILLIAM McMILLAN, OF ADA, INDIAN TERRITORY.

COTTON-CHOPPING ATTACHMENT FOR CULTIVATORS.

SPECIFICATION forming part of Letters Patent No. 728,405, dated May 19, 1903.

Application filed October 24, 1902. Serial No. 128,561. (No model.)

*To all whom it may concern:*

Be it known that I, CHARLES WILLIAM MCMILLAN, a citizen of the United States, residing at Ada, Chickasaw Nation, Indian Territory, have invented a new and useful Cotton-Chopping Attachment for Cultivators, of which the following is a specification.

This invention relates to cotton-chopping attachments for cultivators; and it has for its object to provide a device of this class which although it may be constructed in such a manner as to form an integral part of the cultivating device shall also be capable of being applied to cultivators of ordinary construction without involving the necessity of extensive structural changes in the latter.

Generally speaking, my invention has for its object to provide a cotton-chopping attachment which shall possess superior advantages in point of simplicity, durability, and general efficiency; and with these ends in view it consists in the improved construction, arrangement, and combination of parts, which will be hereinafter fully described, and particularly pointed out in the claims.

In the accompanying drawings, Figure 1 is a side elevation of a cultivator equipped with my improved cotton-chopping attachment, the near wheel having been removed. Fig. 2 is a sectional view taken on the line 2 2 in Fig. 1. Fig. 3 is a sectional detail view to illustrate the construction of the chopping-hoe.

Corresponding parts in the several figures are indicated by similar numerals of reference.

1 designates the axle or axle-frame, 2 the wheels, 3 the tongue, 4 the standards, and 5 the adjusting-levers, of an ordinary cultivator. It should be distinctly understood at the outset that I do not claim these members as part of my invention and also that I do not in any respect limit myself to the form of cultivator herein shown. There are numerous cultivators in the market and in public use, to each of which my invention could be applied practically without changing the cultivator structure with perfect success, and there are others to which my invention might be applied by slightly altering the frame structure, as will be readily understood, in a manner which is within the ordinary skill of a mechanic.

Suitably mounted upon the hub of one of the traction-wheels is a sprocket-wheel 6, from which motion is communicated by means of a chain 7 to a smaller sprocket-wheel 8 upon the end of a shaft 9, the boxes or bearings for which, 10, are mounted upon a block or supporting-piece 11. The latter is supported upon the approximately horizontal arms 12 of a pair of cranks 13, formed at the ends of a shaft 14, which has its bearings on top of the cultivator-tongue 3, which is here shown as being of the bifurcated species. The crank-arms 12 are provided with slots 15 to receive the headed adjusting screws or bolts, by means of which they support the block 11, which latter is thus made capable of sliding adjustment. The shaft 14 also has an upwardly-extending arm 16, connected by a rod 17 with an adjusting-lever 18, preferably fulcrumed upon the axle-frame of the cultivator and which is provided with an ordinary spring-actuated dog or pawl 19, engaging the segment-rack 20, by means of which the crank-shaft 14 and its related parts may be retained at any desired adjustment.

The shaft 9 is provided at its inner end with a bevel-pinion 21, meshing with a bevel-pinion 22 upon the upper end of a shaft 23, which is journaled vertically in the supporting-block 11. Rigidly secured to the shaft 23 is the upper end of a stout coiled spring 24, the lower end of which is likewise rigidly secured to the upper end of a shaft 25, journaled in the upper wall of a box or casing 26 and carrying within the said casing a pinion 27. The shaft 28 of the chopping-hoe is journaled longitudinally in the box or casing 26, and it carries a pinion 28', meshing with the pinion 27, from which it receives motion. The shaft 28 carries at its rear end the hub 29 of the chopping-hoe, which is mounted loosely thereon and which is provided at its front end with one of the members 30 of the friction-clutch, the other member of which, 31, is held in contact therewith by means of a spring 32, coiled upon the shaft 28 and bearing against a collar 33 upon the latter. The adjacent faces of the clutch members are corrugated in such a manner that ordinarily the chopping-hoe will be connected with the shaft with sufficient tenacity to cause it to revolve therewith operatively, while in the event of a too-solid object being struck the spring-actuated clutch member 31 will yield sufficiently to permit the shaft to revolve without injury to the hoe.

The hub 29 of the hoe is preferably provided with a plurality of longitudinal dovetailed grooves 34 to receive the correspondingly-shaped inner ends of the spokes 35, upon the outer end of which the hoe-blades or choppers 36 are mounted. Said blades may be of any desirable construction, and one or more may be used, as may be desired.

Suitably secured to the under side of the tongue 3 of the cultivator and depending therefrom is a rod or bracket 37, the lower end of which is connected by a ball-and-socket joint or other suitable universal joint 38 with a suitably-constructed lever-bar 39, with which the box or casing 26 is rigidly connected. The lever-bar 39 is extended rearwardly, so as to be within reach of the driver, whose seat is indicated at 40 and who may operate the said lever-bar 39 either manually or pedally, as may be preferred.

The operation of my invention will be readily understood from the foregoing description, taken in connection with the drawings hereto annexed. It is preferred that the chopping attachment shall be normally suspended several inches above the ground by the action of a supporting-spring 41, which connects the lever 39 with the under side of the supporting-block 11. When the machine is in operation, rotary motion is transmitted from the traction-wheel 2, having the sprocket-wheel 6, to the shaft 9, having the sprocket-wheel 8 and pinion 21, thence by the pinion 22 to the shaft 23 and to the coiled spring 24, connected with said shaft. The said coiled spring in turn transmits motion to the shaft carrying the pinion 27, meshing with the pinion 29 upon the shaft 28 of the hoe, which is thereby rotated. It has already been explained how, in the event of obstructions being encountered, the shaft 28 may rotate independently of the hoe, and thus without injury to the latter. To cause the revolving hoe to operate upon the row of plants, the rear end of the carrying-lever 39 is depressed by the operator against the tension of the springs 41 and 24, and it will be noticed that owing to the flexible connections the hoe is capable of being adjusted laterally as well as vertically by pressure upon the lever 39, exerted in the proper direction, thus enabling the operator to guide the hoe properly into engagement with the row of plants to be operated upon and which is intermittently "chopped out" in the usual manner, leaving intermediate stands the desired distance apart. As soon as the operator releases the pressure upon the lever 39 the chopping device is restored by the springs 41 and 24 to its normal inoperative position. By means of the lever 18 and its related parts the chopping device may be still further elevated, so as to be out of the way while the device is being transported from one place to another.

I desire it to be understood that while I have described the preferred form of my invention I do not limit myself with regard to the structural details of the same, but reserve the right to any changes and modifications which may be resorted to without departing from the spirit and scope of my invention or sacrificing the utility thereof.

Having described my invention, what I claim is—

1. In a cotton-chopping attachment for cultivators, a supporting-block, means for adjusting, and retaining the same in adjusted position, a shaft journaled vertically in said block, means for transmitting motion to the same, a suitably-supported movable casing, a shaft journaled vertically in said casing, a coiled spring connecting said shaft with the vertical shaft of the supporting-block, a shaft journaled longitudinally in the movable casing and carrying the chopping means, and a pinion upon said shaft, within the casing, meshing with a pinion upon the vertical shaft in said casing.

2. In a cotton-chopping attachment for cultivators, a box or casing supporting the chopping mechanism, a lever-arm carrying said casing and connected by a universal joint with a supporting arm or bracket, an adjustably-mounted supporting-block having a shaft receiving motion from the source of power, and flexible means for transmitting motion from said shaft to the shaft carrying the chopping means.

3. In a cotton-chopping attachment for cultivators, a supporting-block having a shaft receiving motion from the source of power, a box or casing supporting the chopping mechanism, a lever supporting said casing, a spring connecting said lever with the supporting-block and flexible means for transmitting motion from the shaft upon the latter to the chopping mechanism supported in the casing.

4. In a cotton-chopping attachment for cultivators, a supporting-lever having a universal joint, a spring supporting the free end of said lever within reach of the operator, a casing attached to said lever, a shaft journaled longitudinally in said casing, a hub mounted loosely upon said shaft, carrying the chopping-hoes and provided with a friction-clutch member, a spring-actuated clutch member mounted upon the shaft and engaging the clutch member of the hub, and means, including a flexible member, for transmitting motion from the source of power to the shaft carrying the chopping means.

5. A cotton-chopping attachment for cultivators, including a spring-supported lever the fulcrum of which constitutes a universal joint, a casing carried by said lever and carrying a shaft upon which the chopper is loosely mounted, friction means to connect said chopper with the shaft, and means including a flexible member for transmitting motion between the source of power and the chopper-shaft.

6. A cotton-chopping attachment for cultivators, including a spring-supported lever, the fulcrum of which constitutes a universal joint, a casing attached to said lever and carrying a shaft upon which the chopper is mounted, and means, including a coiled spring, for transmitting motion from the source of power to the chopper-shaft, said coiled spring serving additionally to support the casing in which said shaft is journaled.

In testimony that I claim the foregoing as my own I have hereto affixed my signature in the presence of two witnesses.

CHARLES WILLIAM McMILLAN.

Witnesses:
JOHN W. BEARD,
GEO. F. JOHNSON.